Figure 1:
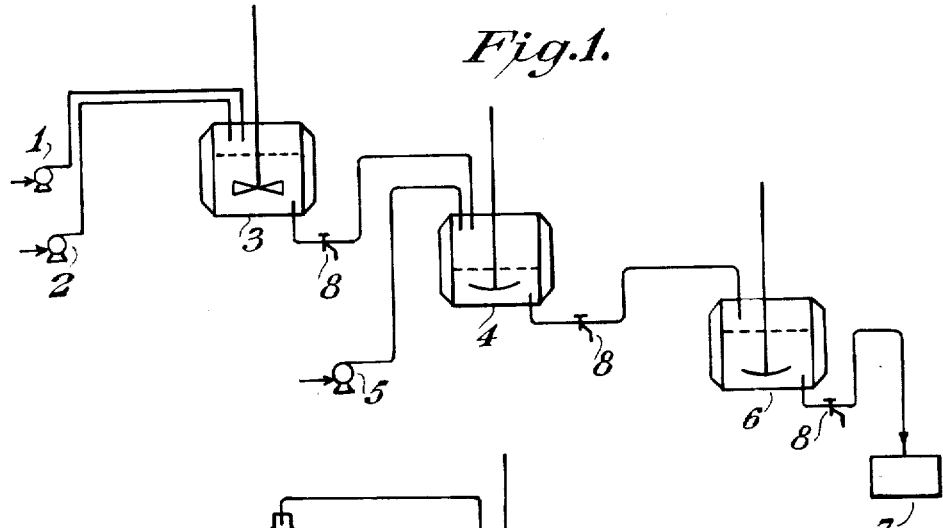

United States Patent [19]
Moore et al.

[11] 4,034,020
[45] July 5, 1977

[54] GRAFT COPOLYMER PREPARATION

[75] Inventors: John David Moore; Ian Robert Wheeler, both of Southampton, England

[73] Assignee: The International Synthetic Rubber Company, Limited, Southampton, England

[22] Filed: Feb. 12, 1976

[21] Appl. No.: 657,631

Related U.S. Application Data

[63] Continuation of Ser. No. 269,022, July 5, 1972, abandoned.

[30] Foreign Application Priority Data

July 6, 1971 United Kingdom ............ 31622/71

[52] U.S. Cl. ........................................... 260/880 R
[51] Int. Cl.² ...................................... C08F 279/04
[58] Field of Search ............................. 260/880 R

[56] References Cited

UNITED STATES PATENTS

| | | | |
|---|---|---|---|
| 2,512,697 | 6/1950 | Grotenhuis | 260/880 |
| 3,243,481 | 3/1966 | Ruffing et al. | 260/880 |
| 3,475,514 | 10/1969 | Nemphos | 260/880 |
| 3,542,905 | 11/1970 | Nishioka et al. | 260/880 |
| 3,632,683 | 1/1972 | Cusano | 260/880 |

OTHER PUBLICATIONS

Kremers et al., "Elements of Chemical Reactor Design and Operation", pp. 62–68, Academic Press, N.Y., 1963.

*Primary Examiner*—William F. Hamrock
*Attorney, Agent, or Firm*—Cushman, Darby & Cushman

[57] ABSTRACT

The invention relates to a continuous flow process for the preparation of graft copolymers, for example ABS, wherein a mixture of a polybutadiene and/or styrenebutadiene copolymer latex, one or more vinyl aromatic monomers and one or more unsaturated nitrile monomers is continuously supplied to a first stage, graft polymerization is initiated in said first stage, the mixture is continuously removed from the said first stage and supplied to at least a second stage wherein graft polymerization is continued, the temperature in each stage being 50° to 100° C, the conversion of monomers to polymer in the first stage not exceeding 65% by weight, and the overall conversion being at least 80% by weight.

7 Claims, 2 Drawing Figures

U.S. Patent  July 5, 1977  4,034,020

GRAFT COPOLYMER PREPARATION

This is a continuation, of application Ser. No. 269,022 filed July 5, 1972 and now abandoned.

This invention relates to a process for the preparation of graft copolymers, e.g. acrylonitrile-butadiene-styrene graft copolymers (ABS).

It is well known in the preparation of graft copolymers such as ABS to graft monomers onto a latex of a rubbery backbone polymer. For example, in the preparation of ABS, acrylonitrile and styrene are frequently grafted onto a latex of rubbery polybutadiene and/or a rubbery styrene-butadiene copolymer. Prior to the grafting reaction, the latex is generally admixed with the monomers to be grafted thereon and the mixture is usually agitated for a period of up to several hours to emulsify the monomers and to enable the rubber particles to absorb them, before the grafting reaction is initiated. This absorption process known as imbibition generally enhances the physical properties of the graft copolymer. Imbibition, where used, is a bath process and so also is the grafting reaction. Alternatively, the grafting reaction is carried out in a batch reaction with no or little imbibition, the monomers being added incrementally to the batch reactor.

We have now found it possible to carry out the imbibition and the grafting reaction continuously to obtain a product having physical properties at least as good as the properties of a similar product from a batch imbibition and grafting.

According to the present invention a process for preparing a graft copolymer comprises admixing one or more vinyl aromatic monomers and one or more unsaturated nitrile monomers with a latex of a rubbery polymer selected from polybutadiene and butadiene-styrene copolymer, characterized by continuously supplying the mixture to a first stage, initiating graft polymerization in said first stage and continuing the polymerization whereby to convert not more than 65% by weight of said monomers to polymer, continuously removing the reaction mixture from said first stage and supplying it to at least a second stage, and further continuing the graft polymerization in said second stage whereby to convert at least 80% by weight of said monomers to polymer, the temperature in each stage being 50° to 100° C.

Optionally, the mixture is imbibed for a period of up to 90 minutes at a temperature of 20° to 90° C under continuous flow conditions before the graft polymerization.

The latex of the rubbery polymer, used as starting material in the process of the present invention, may be obtained by a variety of methods, generally by emulsion polymerization. Where a butadiene-styrene (SBR) copolymer latex is used, the amount of styrene in the copolymer may be up to 30% by weight, (based on total monomers), but is generally 5 to 15%. Latex mixtures of polybutadiene and of SBR, may be used if desired.

It is particularly preferred that the number average particle size (diameter) of the latex is at least 1500 Angstrom units and desirably 2000 to 2800 Angstrom units. The weight average particle diameter is preferably 2500 to 3000 Angstrom units. Preferably the swelling index of the polymer particles (as defined in U.K. Patent Specification No. 965,851 and measured as defined therein except using toluene instead of benzene and using a 200 mesh screen) is 10 to 30, desirably in the range 12 to 20, and the gel content (as determined by coagulation, dissolution in toluene for 24 hours or more at 20° C and filtration through a 200 mesh gauze) is preferably 60 to 90%. Particularly satisfactory latices are those obtained by the method disclosed in our co-pending U.K. Patent Application No. 14626/71, the contents of which are incorporated herein by reference, and the process of this invention is particularly applicable to latices produced by the process described therein.

Examples of vinyl aromatic monomers which may be admixed with the rubber latex are styrene, alpha-methyl styrene, methyl styrene and vinyl toluene, styrene and alpha-methyl styrene being preferred. Examples of unsaturated nitrile monomers are short-chain aliphatic nitriles, e.g. acrylonitrile and methacrylonitrile. The amounts and types of vinyl aromatic monomer(s) and unsaturated nitrile monomer(s) used may be varied to obtain a wide variety of properties in the final graft copolymer, the weight ratio of vinyl aromatic monomer(s) to unsaturated nitrile monomer(s) generally being in the range of 3:1 to 1:1. To prepare a thermoplastic copolymer the rubber content is generally in the range 5 to 40% by weight of the total; the vinyl aromatic content is 40 to 80% by weight and the unsaturated nitrile content 15 to 40% by weight. However to prepare a graft copolymer which is rubbery (usually used for blending with a glassy thermoplastic such as styrene-acrylonitrile copolymer (SAN)), the grafted monomer contents are much lower. For example, 40 to 60% by weight of the total of rubber is grafted with 60 to 40% by weight of the monomers The stability of the rubber latex is desirably increased prior to admixture with the monomer(s) to be grafted since insufficient stability in the latex is liable to cause coagulation. On the other hand overstabilisation of the latex leads to insufficient grafting because the monomers simply copolymerize together and this is reflected in poor physical properties. In some cases the latex may already have sufficient stability in which case no extra emulsifier is required. However it is generally desirable to admix with the latex up to about 4 parts by weight (dry) per hundred parts of monomers plus latex of one or more anionic emulsifiers, for example an alkali metal salt (usually a potassium or sodium salt) of a long chain carboxylic acid (e.g. having 12 to 20 or more carbon atoms). Such a salt is preferably used with a secondary emulsifier such as an alkali metal salt of naphthalene sulphonic acid derivatives (e.g. the sodium salt of naphthalene-sulphonic acid-formaldehyde condensate). Examples of suitable carboxylic acid salts are the salts of unsaturated fatty acids having 15 to 18 carbon atoms such as oleic acid, salts of rosin acid ($C_{20}$) and salts of palmitic acid ($C_{16}$). Particularly preferred salts are potassium oleate and/or rosinate or a mixture of potassium oleate and potassium linoleate with small amounts of other salts, such as is described in our copending U.S. patent applications Ser. Nos. 52,773, now U.S. Pat. No. 3657369, and 60,641, now abandoned. Preferably the amount of carboxylic acid salt emulsifier used is in the range 4.5 to 2.5 parts per hundred of polymer, and of secondary emulsifier, 0 to 1 parts per hundred. Preferably an antioxidant or stabiliser, e.g. a bis-phenol antioxidant, is dissolved in the monomer(s) prior to admixture with the latex and, if desired, a modifier such as t-dodecylmercaptan, the amount of modifier generally being from 0.03 to 0.50 parts by weight per hundred parts of monomers plus rubber. Generally the flow and impact properties of the final graft copolymer may be varied by varying the amount of modifier.

The solids content of the latex-monomer mixture is generally 25 to 30% (calculated solids content at the end of the reaction). Contents lower than 20% are undesirable because of reduced throughput and loss of water-soluble nitrile (e.g. acrylonitrile), whilst contents above 35% cause instability of the mixture.

The latex-monomers mixture is emulsified and preferably is imbibed for a period of up to 90 minutes at a temperature of 20° to 90° C under continuous flow conditions. In some cases it is possible to omit imbibition altogether (i.e. the imbibition time is zero) whilst still retaining acceptable physical properties in the final graft copolymer. The imbibition may simply take place in an in-line mixer or an in-line mixer coupled to one or more tubes (preferably vertical), or a cascade vessel, preferably stirred, the imbibed latex being removed at the outlet (which is preferably remote from the inlet). Where imbibition is used, preferably the imbibition time is up to 50 minutes and preferably the imbibition temperature is 50° to 70° C. In general the imbibition period varies inversely with the imbibition temperature.

The graft polymerization reaction is preferably carried out in two stages and preferably the reaction time is kept relatively short, e.g. 10 to 40 minutes. However, up to, for example, ten stages may be used, but this is generally of no advantage and is more expensive. The stages may take place in separate reactors which are preferably stirred and adapted for temperature control. Generally when two reactors are used these are connected in cascade and adjusted so that the temperature of the first stage (T1) is in the range 70° to 90° and the temperature of the second (T2) preferably equal to or above temperature T1. Generally the residence time in the first reactor is such as to achieve a conversion of monomers of not more than 65%, the reaction in the second (or last) reactor preferably being taken to as high a conversion as possible, for example 80 to 95%. Normally in ABS production it is not possible to achieve conversions in excess of about 95% because of the water solubility of acrylonitrile.

The residence time in the first reactor, i.e. time for the first stage, may be, for example, 10 minutes at a temperature of 75° to 80° C, and the residence time in the second reactor (time for the second state) e.g. 20 minutes at a temperature in the same range. However where alpha methyl styrene is being polymerized in a comparatively high percentage, reaction times of 2 to 3 hours may give improved properties. Preferably the rate of conversion of monomers (as measured by solids content) does not exceed 5% per minute. The grafting reaction is exothermic and if desired the heat of polymerization is retained in the reaction mixture. Rate of reaction may be varied by controlling the reaction temperature.

The grafting reaction may be initiated using e.g. 0.1 to 1% by weight of monomers and rubber of a free radical initiator such as potassium persulphate, tertiary butyl peroctoate, a peroxide such as benzoyl peroxide or lauroyl peroxide or a hydroperoxide e.g. cumene hydroperoxide or di-isopropyl benzene hydroperoxide which may be activated using, for example, ferrous iron. Activated cumene hydroperoxide is preferred. Conveniently the free radical initiator is admixed with the rubber latex and the activator injected into the first reactor, although where initiation is slow the initiator may be injected during the imbibition stage.

Variation is the types and amounts of monomers and the conditions of imbibition and grafting enables the preparation of graft copolymers having a wide variety of physical properties. For example, general purpose, easy flow and heat resistant grades of ABS may readily be prepared.

After grafting, the graft copolymer latex and any unreacted monomer(s), may be aged at elevated temperature, in a separate vessel, if desired, or in certain cases the latex may be recycled for further reaction. The graft copolymer may be recovered by coagulation of the latex, and then washed and dried.

The graft copolymer obtained by the process of the invention may be compounded with e.g. lubricants, fillers and/or thermoplastics as desired, and may be used as a raw material for moulding or shaping into a wide variety of articles.

The following examples illustrate the process of the present invention:

EXAMPLE 1

A polybutadiene latex of 25% solids having a number average particles diameter 2237 A, a weight average particle diameter of 2800 A, a gel content of 95% and a swelling index of 12 (measured as described herein), was prepared by the method disclosed in our copending U.K. Patent Application No. 14626/71 and corresponding U.S. Patent Application Ser. No. 250,745 As described in said U.K. application No. 14626/71 and U.S. patent application Ser. no. 250,745, now U.S. Pat. No. 3,833,532 there is disclosed a process for the preparation of a rubbery polybutadiene latex having particles of number average particles diameter ($\bar{D}n$) of at least 1500 A and of weight average particle diameter ($\bar{D}w$) of at least 2500 A comprising:

1. preparing an aqueous emulsion of butadiene containing 0.5 to 1.5 parts by weight of an anionic emulsifier per hundred parts of butadiene and in addition a thermallydecomposable free radical initiator,
2. initiating polymerization and allowing polymerization to proceed under conditions such that the temperature of the reaction mixture is in excess of 85° C, for at least a part of the reaction, and
3. recovering the latex.

Without further treatment, styrene and acrylonitrile were continuously graft polymerized onto the above latex by an emulsion polymerization technique, using the apparatus shown in FIG. 1 of the accompanying drawings wherein a source of latex feedstock 1 and of monomer feedstock 2 are connected to a stirred jacketed imbibition vessel 3 maintained at a temperature of 65° to 70° C. This vessel is connected to a stirred jacketed reactor 4 maintained at a temperature of approximately 80° C. A source of activator 5 is also connected to reactor 4. Reactor 4 is connected in cascade to a second stirred jacketed reactor 6 also maintained at a temperature of approximately 80° C whence the graft copolymer latex is recovered and passed to storage vessel 7. Where drainage taps 8 are fitted.

In a laboratory preparation, latex and monomer feedstocks, prepared as shown in Table 1, were continuously metered into vessel 3, where emulsification of the monomers and the latex particles took place at 65° C for a period of 30 minutes. The emulsified material spilled into reactor 4 and a glucose-ferrous sulphate initiator (see Table 1) was continuously added so as to give approximately 40% polymerisation in ten minutes at 80° C (T1). The partly converted material spilled into second reaction vessel 6, where conversion reached 80 to 85% in a further period of 30 minutes at 80° C (T2).

The graft latex was recovered by coagulation at 95° C in dilute calcium chloride solution acidified with E.D.-T.A., to form a crumb which was dried in a vacuum oven for 12 hours at 65° C. After compounding the dried crumb at 180° C with the lubricants barium stearate (1 phr) and Armogel (hydrogenated castor oil — Armour Chemical Co.) (1 phr) and with a phosphite stabilizer Mark C (Lankre Chemicals) (0.5 phr), compression moulded test pieces were prepared and tested with the following results:

| A.S.T.M. TEST | PROPERTY | RESULT |
| --- | --- | --- |
| D256-56 (1961) | Notched Impact Strength (⅛″ bar) at 23° C | 7.6 Ft. lbs |
| D785 | Rockwell Hardness at 23° C | R97 |
| D1238-65T | Melt Index (at 200° C/5Kg.) | 0.5 g/10 min. |

Figure 2:
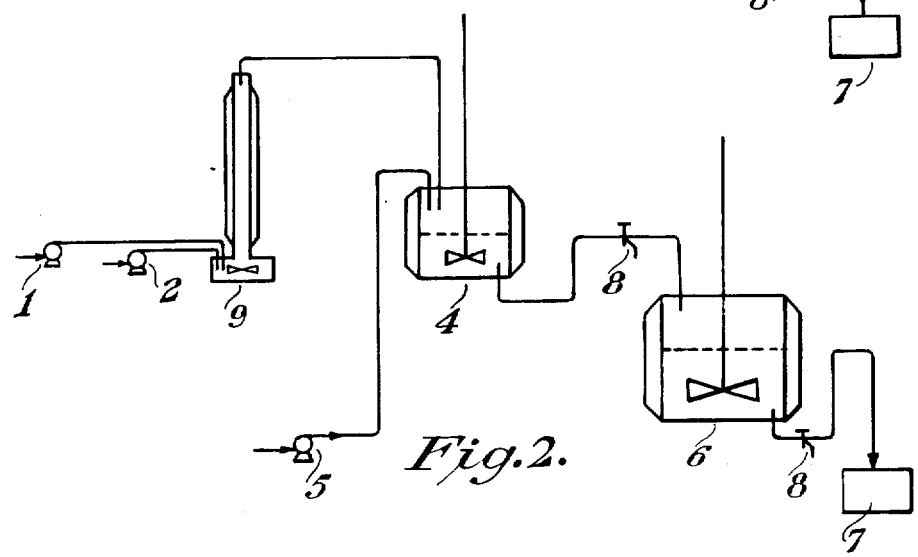

Substantially similar results are obtained on repeating this example using the apparatus shown in FIG. 2 of the accompanying drawings wherein inhibition vessel 9 is a jacketed vertical tube maintained at a temperature of 65° to 70° C, the base of which was a stirred cavity.

TABLE 1

| LATEX FEEDSTOCK: | parts by Wt. (Dry) |
| --- | --- |
| Polybutadiene (25% by weight solids) | 24 |
| Potassium Oleate | 2 (as 10% solution) |
| Dispersol LR | 0.2 (as 10% solution) |
| Cumene hydroperoxide | 0.6 (as 70% solution) |
| Water | to 25% total final solids |
| MONOMER FEEDSTOCK: | |
| Styrene | 50 |
| Acrylonitrile | 26 |
| T.D.M. modifier | 0.3 |
| bis-phenol antioxidant - Plastanox 425 (Cyanamid U.K. Ltd.) | 0.24 |
| ACTIVATOR FEEDSTOCK: | 15 |
| The activator feedstock comprised:- | |
| Glucose | 2.4 |
| Tetra-Sodium Pyrophosphate | 2 |
| Ferrous Sulphate | 0.04 |
| Water | 100 |

EXAMPLES 2 TO 4

Example 1 was repeated using the formulation and conditions shown in Table 2.

TABLE 2

| | | Stage 1 | | | Stage 2 | | |
| --- | --- | --- | --- | --- | --- | --- | --- |
| Ex | Latex Styrene Acrylonitrile (Parts by dry weight) | | Con-ver-sion | Time mins | T1 ° C | Con-ver-sion | Time mins | T2 ° C |
| 2 | 60 | 26.3 | 13.7 | 40% | 40 | 75° | 90% | 50 | 94° |
| 3 | 15 | 56.5 | 26 | 40% | 30 | 85° | 91% | 40 | 94° |
| 4 | 24* | 50 | 26 | 40% | 10 | 80° | 85% | 30 | 80° |

*Latex = 21 parts (dry) polybutadiene
3 parts (dry) S.B.R.

The properties of the graft copolymers, measured as in Example 1, are as follows:

| Property | Ex 2** | Ex 3 | Ex 4 |
| --- | --- | --- | --- |
| Impact Strength | 7.5 ft lbs | 4.0 ft lbs | 8.5 ft lbs |
| Rockwell Hardness | 89 | 102 | 92 |
| Melt Index | 0.5 g/10 min | 4.2 g/10 | 0.5 g/10 min |

**After blending 40 parts of copolymer product
60 parts of styrene-acrylonitrile copolymer
1 part of lubricant (ethylene bis stearamide)

For compression Example 1 was repeated only taking the graft reaction to completion in one vessel (shown as 4 in FIG. 1), by-passing the reactor 6, the temperature of vessel 4 being 85° to 90° C and the reaction time being 45 minutes. Grafting in one stage in this way gave a product of inferior properties, the impact strength being only 5.5 ft. lbs at a hardness of 90 and a melt flow of 0.4 g/10 minutes.

What is claimed is:

1. A process for preparing a graft copolymer comprising admixing one or more vinyl aromatic monomers and one or more unsaturated nitrile monomers with a latex of a rubbery polymer selected from polybutadiene and butadiene-styrene copolymer, characterised by imbibing the mixture for a period of 30 to 50 minutes at a temperature of from 20° to 90° C under continuous flow conditions continuously supplying the imbibed mixture to a first stirred reactor, at a temperature (T1) of 70° to 90° C, initiating emulsion graft polymerisation in the presence of a free radical initiator in said first stirred reactor and continuing the polymerisation to effect conversion of 40 to 65% by weight of the monomers at a rate not more than 5% per minute, continuously removing the reaction mixture from said first stirred reactor and supplying it to a second stirred reactor, at a temperature equal to or above T1 but not over 100° C and further continuing the graft polymerisation in the second stirred reactor whereby to convert at least 80% by weight of the monomers to polymer.

2. A process according to claim 1 wherein the solids content of latex-monomer mixture is 20 to 35% and there is present an anionic emulsifier.

3. A process according to claim 2 wherein the solids content of the latex-monomer mixture is 25 to 30%.

4. A process according to claim 2 wherein the imbibing time is 30 minutes.

5. A process according to claim 1 wherein the latex is a polybutadiene latex having particles of number average particle diameter ($\overline{D}n$) of at least 1500 A and of weight average particle diameter ($\overline{D}w$) of at least 2500 A and prepared by a process comprising:

1. preparing an aqueous emulsion of butadiene containing 0.5 to 1.5 parts by weight of an anionic emulsifier per hundred parts of butadiene and in addition a thermally-decomposable free radical initiator, 2. initiating polymerization and allowing polymerization to proceed under conditions such that the temperature of the reaction mixture is in excess of 85° C for at least a part of the reaction, and 3. recovering the latex.

6. A process according to claim 1 wherein the heat of the polymerization is retained in the reaction mixture in the first and second reactors.

7. A process according to claim 1 wherein the vinyl aromatic monomer is styrene or alpha methyl styrene and the unsaturated nitrile monomer is acrylonitrile or methacrylonitrile and the ratio of vinyl aromatic monomer to unsaturated nitrile monomer is from 3:1 to 1:1.

* * * * *